US012390830B2

(12) United States Patent
Schäuble et al.

(10) Patent No.: US 12,390,830 B2
(45) Date of Patent: Aug. 19, 2025

(54) HANDHELD DEVICE, METHOD AND ATTACHMENT DEVICE

(71) Applicant: FESTOOL GMBH, Wendlingen (DE)

(72) Inventors: Daniel Schäuble, Badenweiler (DE); Christoph Dieter, Gomaringen (DE)

(73) Assignee: Festool GmbH, Wendlingen (DE)

( * ) Notice: Subject to any disclaimer, the term of this patent is extended or adjusted under 35 U.S.C. 154(b) by 155 days.

(21) Appl. No.: 17/997,190

(22) PCT Filed: Feb. 3, 2021

(86) PCT No.: PCT/EP2021/052535

§ 371 (c)(1),
(2) Date: Oct. 26, 2022

(87) PCT Pub. No.: WO2021/219262

PCT Pub. Date: Nov. 4, 2021

(65) Prior Publication Data

US 2023/0158541 A1 May 25, 2023

(30) Foreign Application Priority Data

Apr. 27, 2020 (DE) ..................... 10 2020 205 308.1

(51) Int. Cl.

| | |
|---|---|
| ***B05C 17/01*** | (2006.01) |
| ***B05C 17/005*** | (2006.01) |
| *B05C 11/10* | (2006.01) |

(52) U.S. Cl.

CPC ...... *B05C 17/0116* (2013.01); *B05C 17/0052* (2013.01); *B05C 17/0103* (2013.01); *B05C 11/1021* (2013.01); *B05C 11/1023* (2013.01)

(58) Field of Classification Search

CPC ............. B05C 17/0116; B05C 17/0052; B05C 11/1021; B05C 11/1023; B05C 17/0103

See application file for complete search history.

(56) References Cited

U.S. PATENT DOCUMENTS 6,942,736 B2 * 9/2005 Chinander .......... B05C 17/0103 118/692
7,048,964 B2 * 5/2006 McGlinchy ............... E06B 3/24 427/284

(Continued)

FOREIGN PATENT DOCUMENTS

CN 108745806 11/2018
DE 10 2009 045 891 4/2011

(Continued)

OTHER PUBLICATIONS

Examination Report issued in corresponding German Patent Application No. 10 2020 205 308.1, Nov. 16, 2020, 8 pages.

(Continued)

*Primary Examiner* — Frederick C Nicolas

(74) *Attorney, Agent, or Firm* — HSML P.C.

(57) ABSTRACT

A handheld device, in particular a cartridge press and/or tubular bag press, for dispensing filling material into a joint, including: a handle assembly for manually gripping the handheld device and for moving the handheld device along a joint path, a dispensing device for dispensing the filling material into the joint, and a sensor device which is designed to detect an influencing quantity. The influencing quantity influences the body geometry of a filling material body formed by the filling material dispensed into the joint, in which the handheld device is adapted to adjust a dispensing rate (r) at which the dispensing device dispenses the filling material based on the detected influence quantity.

18 Claims, 5 Drawing Sheets

(56) References Cited

U.S. PATENT DOCUMENTS

| | | | | |
|---|---|---|---|---|
| 8,400,503 | B2 * | 3/2013 | Linnenkohl | G01N 21/88 348/130 |
| 8,568,121 | B2 * | 10/2013 | Khoshnevis | B28B 3/20 425/63 |
| 9,359,122 | B2 * | 6/2016 | Schmid | G01F 11/029 |
| 9,475,231 | B2 * | 10/2016 | Conrad | F16L 13/116 |
| 10,894,272 | B2 * | 1/2021 | Turner | H04W 4/80 |
| 2005/0048206 | A1 | 3/2005 | Chinander et al. | |
| 2011/0151042 | A1 | 6/2011 | Strobel-Schmidt et al. | |
| 2014/0252025 | A1 | 9/2014 | Schmid et al. | |
| 2015/0091292 | A1 | 4/2015 | Conrad et al. | |
| 2020/0001320 | A1 | 1/2020 | Turner et al. | |

FOREIGN PATENT DOCUMENTS

| | | |
|---|---|---|
| DE | 10 2011 081 137 | 2/2013 |
| WO | 03/006178 | 1/2003 |
| WO | 2013/104362 | 7/2013 |

OTHER PUBLICATIONS

International Search Report issued in International Application No. PCT/EP2021/052535, May 21, 2021, 6 pages w/translation.

Written Opinion issued in International Application No. PCT/EP2021/052535, May 21, 2021, 8 pages.

* cited by examiner

HANDHELD DEVICE, METHOD AND ATTACHMENT DEVICE

The invention relates to a handheld device for dispensing filling material into a joint. The handheld device is designed, for example, as a cartridge press and/or a tubular bag press. The filling material is, for example, joint sealant, in particular silicone or acrylic. The handheld device comprises a handle assembly for manually gripping the handheld device and moving the handheld device along a joint path. The handheld device further comprises a dispensing device for dispensing the filling material into the joint.

SUMMARY OF THE INVENTION

It is an object of the invention to provide a handheld device which makes it easier for the user to achieve, when dispensing the filling material into the joint, a desired body geometry, for example a body geometry which is as uniform as possible, of the filling material body formed by the dispensed filling material. The filling material body has, for example, an elongated, in particular string-shaped body geometry and should expediently have a constant width along the length of the filling material body.

The object is solved by a handheld device according to claim 1. The handheld device comprises a sensor device adapted to detect an influencing quantity influencing the body geometry of the filling material body formed by the filling material dispensed into the joint. The influence quantity is, for example, a handheld device speed at which the handheld device is moved, or relates to a joint geometry of the joint. The handheld device speed may also be referred to as pulling speed. The handheld device is adapted to adjust a dispensing rate at which the dispensing device dispenses the filling material, based on the detected influence quantity. The dispensing rate is the amount of filling material that is dispensed per unit of time.

In this way, the handheld device can compensate for one or more interfering influencing quantities, such as a varying handheld device speed and/or a varying joint geometry, and thus prevent these one or more influencing quantities from affecting the body geometry of the filling material body in an undesirable manner.

If, for example, the user guides the handheld device along the joint path at a varying—i.e. not constant—handheld device speed when dispensing the filling material, this results in a conventional handheld device dispensing more filling material (per unit length of the joint path) at joint sections where the handheld device speed is lower than at joint sections where the handheld device speed is higher. The result is a filling material body with a non-uniform body geometry.

According to a preferred embodiment, the handheld device described can be used to detect the handheld device speed and to adjust the dispensing rate of the filling material to the detected handheld device speed. For example, at a higher detected handheld speed, the handheld device dispenses the filling material at a higher dispensing rate than at a lower detected handheld speed. In this way, the influence of the varying handheld speed on the body geometry can be compensated and it becomes possible, for example, to achieve a uniform body geometry (despite a varying handheld speed).

If, for example, the joint geometry, in particular the joint width, varies along the joint path, this can, with a conventional handheld device, have the result that at joint sections where the joint width is smaller (and therefore less filling material is required for filling and/or covering the joint) too much filling material for the given joint width is dispensed, and, at joint sections where the joint width is larger (and therefore more filling material is required for filling and/or covering the joint), too little filling material for the given joint width is dispensed. This results in uneven filling and/or covering of the joint along the joint path.

According to a preferred embodiment, the joint geometry, in particular the joint width, can be detected by means of the described handheld device and the dispensing rate of the filling material can be adapted to the detected joint width. For example, the handheld device outputs the filling material at a higher dispensing rate when the joint width is greater than when the joint width is smaller. In this way, the influence of the varying joint width on the body geometry, in particular the filling and/or covering of the joint, can be compensated for and it becomes possible, for example, to achieve a uniform filling and/or covering of the joint (despite a varying joint width).

Advantageous further developments are defined in the subclaims.

The invention further relates to a method for dispensing filling material into a joint with a handheld device, in particular a cartridge press and/or a tubular bag press, comprising the steps of: Moving the handheld device along the joint path, dispensing the filling material into the joint, detecting an influence quantity influencing a body geometry of a filling material body formed by the filling material dispensed into the joint, and adjusting the dispensing rate at which the filling material is dispensed, based on the detected influence quantity.

The method is expediently carried out by means of the described handheld device and/or is designed in accordance with a described further development of the handheld device.

The invention further relates to an attachment device for detachable attachment to a driver device to form a handheld device for dispensing filling material into a joint, comprising: a dispensing device for dispensing the filling material into the joint, the dispensing device being drivable by the drive device, and a sensor device adapted to detect an influence quantity influencing a body geometry of a filling material body formed by the filling material dispensed into the joint, wherein the attachment device is adapted to provide a control signal to the drive device based on the detected influence quantity to control the drive of the dispensing device to adjust the dispensing rate at which the dispensing device dispenses the filling material.

BRIEF DESCRIPTION OF THE DRAWINGS

Further exemplary details as well as exemplary embodiments are explained below with reference to the figures. Thereby shows FIG. 1 a side view of a handheld device and a processing area, FIG. 2 a top view of a handheld device guided along a joint, together with a diagram showing a handheld device speed and dispensing rate, FIG. 3 a block diagram of a handheld device with a first composition, FIG. 4 a block diagram of a handheld device with a second composition, FIG. 5 a perspective view of the handheld device without inserted filling material container, FIG. 6 a perspective view of the handheld device with inserted filling material container, and FIG. 7 a sectional view of a filling material container in which a pressing element is inserted.

DETAILED DESCRIPTION OF THE INVENTION

In the following explanations, reference is made to the spatial directions "x-direction", "y-direction" and "z-direction" which are orthogonal to each other. The x-direction and the y-direction are horizontal directions, and the z-direction is a vertical direction (in a horizontal use position of the handheld device 10).

Figure 1:
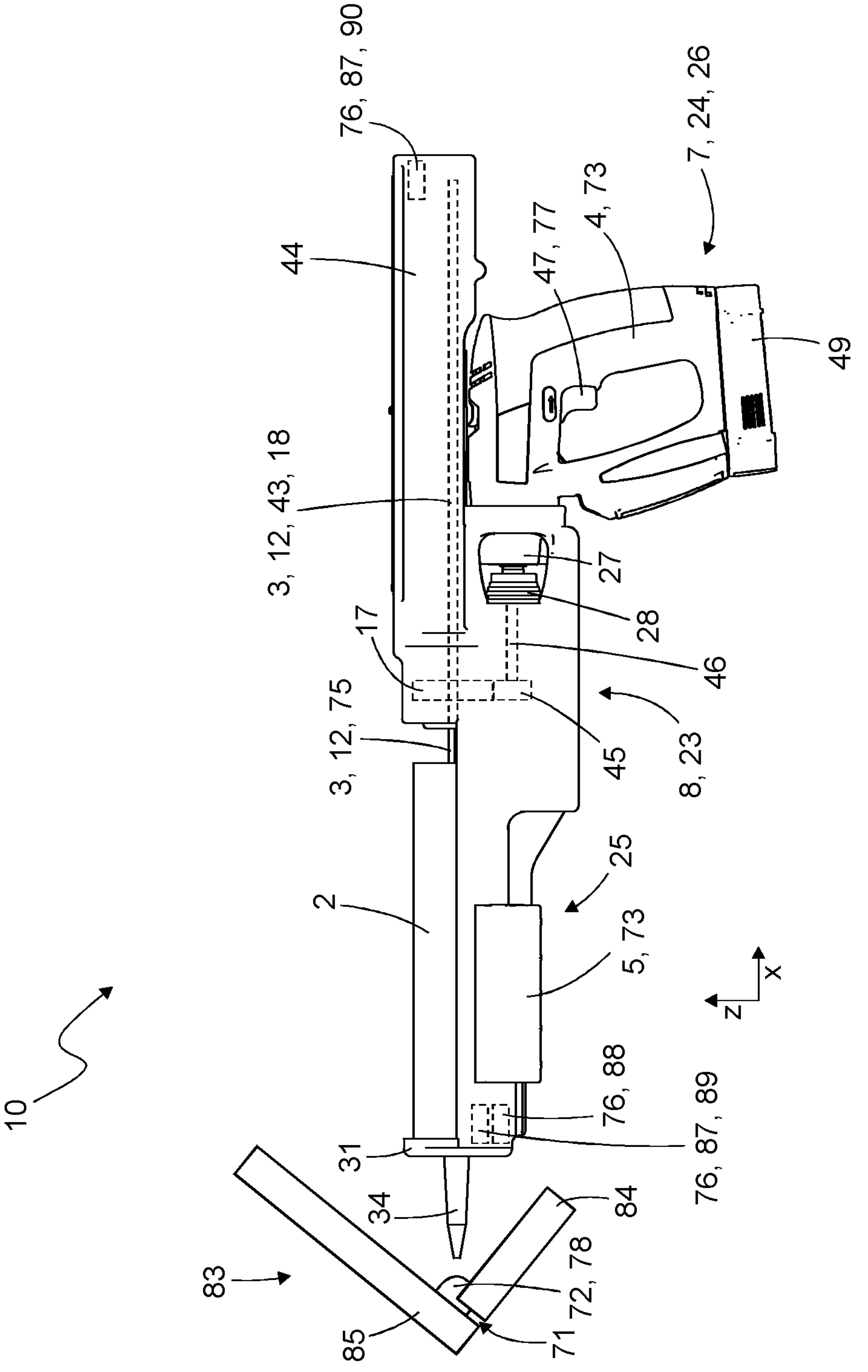

FIG. 1 shows the handheld device 10 together with a processing area 83. The processing area 83 comprises a joint 71. Exemplarily, the processing area 83 includes a first area portion 84 and a second area portion 85 and the joint 71 is located between the two area portions 84, 85. For example, the area portions 84, 85 are building materials, such as tiles. For example, the first area portion 84, is a tile, a panel, a door frame, a window frame, or a molding. The second area portion 85 is, for example, another tile or a wall. The joint 71 between the area portions 84, 85 may also be referred to as a gap or cavity.

The handheld device 10 is exemplarily designed as a cartridge press and/or as a tubular bag press. The handheld device 10 may also be referred to as a filling material container press. The handheld device 10 is used to dispense filling material 72 into the joint 71. The filling material 72 is, for example, silicone or acrylic. The filling material 72 is expediently held in a filling material container 2, for example a cartridge or a tubular bag, and dispensed from the filling material container 2 into the joint 71 by means of the handheld device 10.

Figure 2:
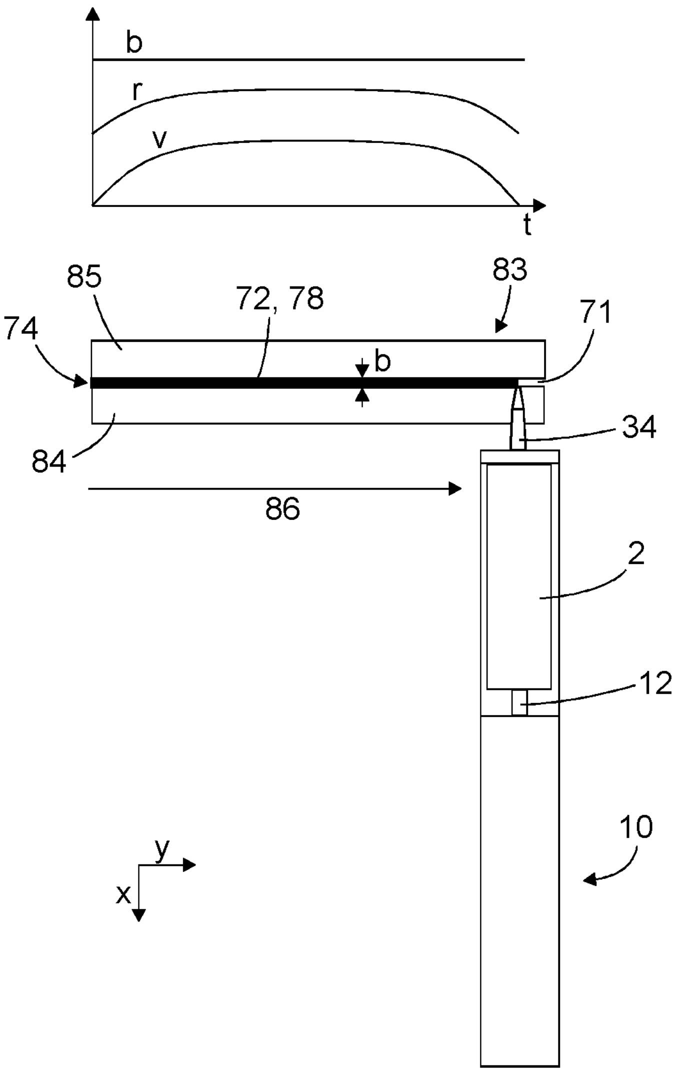

The handheld device 10 includes a handle assembly 73 for manually gripping the handheld device 10 and moving the handheld device 10 along a joint path 74 (shown in FIG. 2). The handheld device 10 can be carried manually by the user and moved and positioned freely in space manually. The handheld device 10 is not fixed or suspended anywhere. The joint path 74 is the path of the joint 71 in the longitudinal direction of the joint 71. Exemplarily, the joint path 74 runs in the y-direction—i.e. perpendicular to the drawing plane of FIG. 1.

The handheld device 10 further comprises a dispensing device 75 for dispensing the filling material 72 into the joint 71. Exemplarily, the dispensing device 75 comprises a pressing device 3 for pressing the filling material container 2 to cause dispensing of filling material 72 contained in the filling material container 2. The filling material 72 is dispensed into the joint 71 via a dispensing element 34, for example an applicator tip.

The handheld device 10 further comprises a sensor device 76 configured to detect an influence quantity that influences a body geometry of a filling material body 78. The filling material body 78 is formed by the filling material 72 dispensed into the joint 71. The filling material body 78 may also be referred to as a bead. Preferably, the influencing quantity is the handheld device speed v and/or concerns the joint geometry.

The handheld device 10 is adapted to adjust a dispensing rate r, at which the dispensing device 75 dispenses the filling material 72, based on the detected influence quantity. The dispensing rate r is the amount of filling material 72 that is output from the handheld device 10 per unit time.

For example, the handheld device 10 has a pressing element 12 for pressing the filling material container 2 to cause the filling material 72 to be dispensed from the filling material container 2. In particular, the handheld device 10 is adapted to adjust the dispensing rate r by adjusting the speed of the pressing element 12. For example, the handheld device 10 has an electric drive 16 (see FIG. 3 or 4) for driving the pressing element 12 and is adapted to adjust the speed of the electric drive 16, for example by adjusting the current supplied to the electric drive 16, based on the influence quantity to adjust the dispensing rate r.

Expediently, the handheld device 10 is configured to continuously detect the influence quantity and continuously adjust the dispensing rate r based on the influence quantity. For example, the handheld device 10 continuously detects the current handheld device speed and/or the current joint geometry and continuously adjusts the current dispensing rate r to the current handheld device speed and/or the current joint geometry.

Preferably, the handheld device 10 is configured to adapt the dispensing rate r on the basis of the detected influence quantity in such a way that the filling material body 78 formed by the filling material 72 dispensed into the joint 71 has a predetermined body geometry, in particular a predetermined width b, preferably a constant width b. For example, a specification information is stored in the handheld device 10, which specifies a body geometry, in particular a width, of the filling material body 78. The handheld device 10 is configured to adjust the dispensing rate r on the basis of the detected influence quantity and the specification information in such a way that the body geometry of the filling material body 78 corresponds to the specification information.

The handheld device 10 is expediently configured to adjust the dispensing rate r on the basis of the influencing quantity in such a way that the dispensing device 75 dispenses a predetermined, in particular constant, amount of filling material per unit length of the joint path 74. For example, a specification information is stored in the handheld device 10, which specifies a filling material amount per unit length. The handheld device 10 is configured to adjust the dispensing rate r on the basis of the detected influence quantity and the specification information in such a way that the filling material amount per unit length corresponds to the specification information.

According to a preferred embodiment, the influence quantity comprises the handheld device speed v at which the handheld device 10 is moved. The handheld device 10 is configured to detect the handheld device speed v as the influence quantity and to adjust the dispensing rate r based on the handheld device speed v.

In particular, the handheld device speed v is the speed of the handheld device 10 relative to the joint path 74. Expediently, the handheld device 10 comprises a dispensing element 34, in particular an applicator tip, for dispensing the filling material 72 into the joint 71. In particular, the handheld device speed v is the speed of the dispensing element 34 relative to the joint path 74.

In particular, the handheld device 10 is configured to adjust the dispensing rate r on the basis of the detected handheld device speed v so that the filling material body 78 has a predetermined body geometry, in particular a predetermined width b, preferably a constant width b, in particular along the joint path 74.

Figure 5:
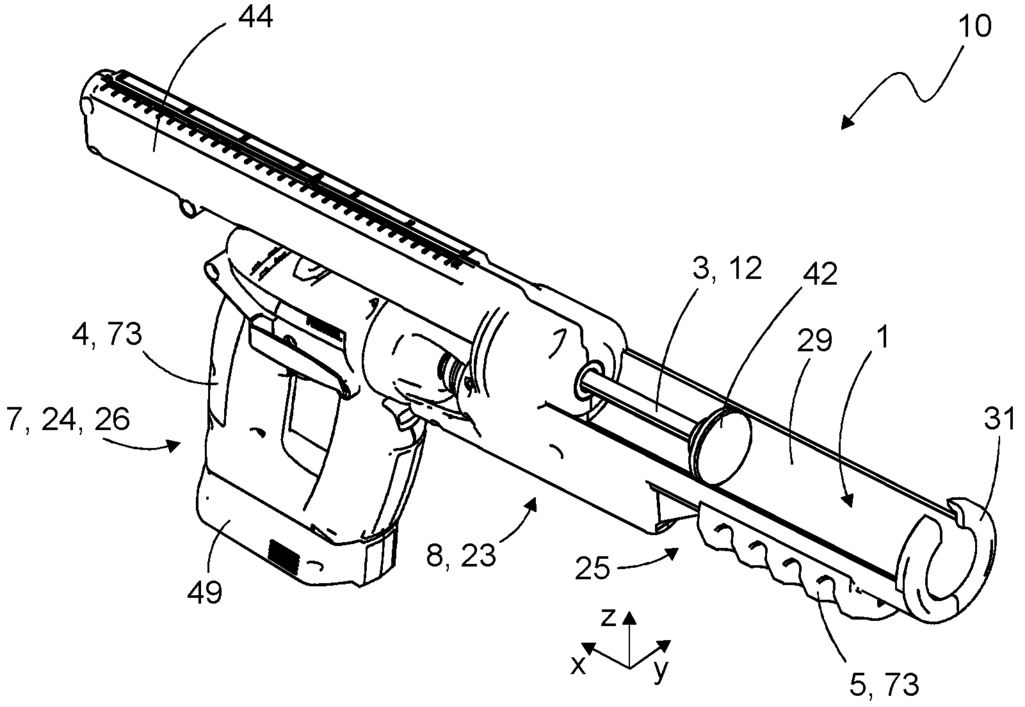

FIG. 2 shows a corresponding adjustment of the dispensing rate r. In FIG. 5, the user performs a handheld device movement 86 with the handheld device 10, in which the handheld device 10 is guided along the joint path 74, in particular with the dispensing element 34. FIG. 5 shows the time curves of the handheld device speed v, the dispensing rate r and the width b of the filling material body 78. The width b is the width of the filling material body 78 orthogonal to the longitudinal direction of the joint path 74. The width b is in particular the width of that part of the filling material body 78 which lies above the joint 71 or covers the joint 71.

Preferably, the handheld device 10 is configured to increase the dispensing rate r of the filling material 72 in response to an increasing detected handheld device speed v. Expediently, the handheld device 10 is further configured to reduce the dispensing rate r of the filling material 72 in response to a decreasing detected handheld device speed v.

Expediently, the handheld device 10 is configured to provide the dispensing rate r in proportion to the detected handheld device speed v and/or with a monotonic, in particular strictly monotonic, dependence on the handheld device speed v.

Thus, the handheld device 10 dispenses the filling material at a higher dispensing rate r at a first detected handheld device speed v than at a second detected handheld device speed v that is lower than the first detected handheld device speed v.

Expediently, the handheld device 10 is configured to adjust the dispensing rate r on the basis of the handheld device speed v in such a way that the dispensing device 75 dispenses, along the joint path 74, a predetermined, in particular constant, amount of filling material per unit length of the joint path 74.

According to a further embodiment, the influence quantity relates to the joint geometry. The handheld device 10 is configured to detect the joint geometry, in particular a joint width, as the influence quantity and to adjust the dispensing rate r on the basis of the detected joint geometry, in particular the joint width. The joint width is in particular the width of the joint 71 orthogonal to the direction of the joint path 74.

Preferably, the handheld device 10 is configured to adjust the dispensing rate r on the basis of the detected joint geometry in such a way that the filling material body 78 has a predetermined body geometry, in particular a predetermined width b, preferably a constant width b. The width b is the width of the filling material body 78 orthogonal to the longitudinal direction of the joint path 74. The width b is in particular the width of that part of the filling material body 78 which lies above the joint 71 or covers the joint 71.

Preferably, the handheld device 10 is configured to increase the dispensing rate r of the filling material 72 in response to an increasing detected joint width. Expediently, the handheld device 10 is configured to reduce the dispensing rate r of the filling material 72 in response to a decreasing detected joint width. Expediently, the handheld device 10 is configured to provide the dispensing rate r in proportion to the detected joint width and/or with a monotonic, in particular strictly monotonic, dependence on the joint width.

Thus, the handheld device 10 dispenses the filling material at a higher dispensing rate r for a first detected joint width than for a second detected joint width that is lower than the first detected joint width.

According to a particularly preferred embodiment, the handheld device 10 is configured to take into account both the handheld device speed v and the joint geometry, in particular the joint width, as the influence quantity. The handheld device 10 thus adjusts the dispensing rate r simultaneously on the basis of the handheld device speed v and on the basis of the joint geometry, in particular on the basis of the joint width. The dependency between the dispensing rate r and the handheld device speed v and the dependency between the dispensing rate r and the joint geometry is preferably as described above.

The sensor device 76, by means of which the handheld device 10 detects the influence quantity—i.e. in particular the handheld device speed v and/or the joint geometry—will be discussed in more detail below.

Preferably, the sensor device 76 for detecting the influence quantity comprises an accelerometer, an odometry unit, a laser unit, an image sensor, a LIDAR unit, a RADAR unit, and/or a touch sensor.

Preferably, the sensor device 76 comprises a first sensor unit 87 by means of which the handheld device speed v is detected. The first sensor unit 87 is designed, for example, to detect the acceleration of the handheld device 10. The handheld device 10 is configured to calculate the handheld device speed v based on the detected acceleration, in particular by integrating the detected acceleration. The first sensor unit 87 expediently comprises a first sensor element 89, which is configured, for example, as an acceleration sensor. The first sensor element 89 is expediently arranged at a front end—that is, at that end at which the dispensing element 34 is located—of the handheld device 10, in particular of a horizontal section 23 of the handheld device 10. In a purely exemplary manner, the first sensor unit 87 further comprises a second sensor element 90, which is configured, for example, as an acceleration sensor. The second sensor element 90 is expediently arranged at a rear end—that is, at that end which faces away from the dispensing element 34—of the handheld device 10, in particular of the horizontal section 23 of the handheld device 10.

According to an alternative embodiment, the first sensor unit 87, in particular the first sensor element 89, is designed as an image sensor. Preferably, the handheld device 10 is configured to record a plurality of sequential images with the first sensor unit 87 and to calculate the handheld device speed v based on the plurality of recorded images. Preferably, the handheld device 10 is further configured to detect the joint geometry, in particular the joint width, based on the plurality of captured images, for example using an image processing algorithm. Thus, the first sensor unit 87 can suitably be used both to detect the handheld device speed v and to detect the joint geometry, in particular the joint width.

The first sensor unit 87 can thus, for detecting the handheld device speed, have one or two acceleration sensors (to improve accuracy), an odometry unit (to perform an odometric method), a laser unit (for a laser measurement), and/or an image sensor (for example, an optical camera for an image evaluation). Expediently, the first sensor unit 87 may also comprise a combination of said units.

Optionally, the sensor device 76 further comprises a second sensor unit 88 by means of which the joint geometry is detected (in particular in the case in which the joint geometry is not detected by the first sensor unit 87). Preferably, the second sensor unit 88 is designed as an image sensor. Suitably, the handheld device 10 is designed to capture a plurality of sequential images with the second sensor unit 88 and to detect the joint geometry, in particular the joint width, on the basis of the plurality of captured images, for example using an image processing algorithm.

Thus, the second sensor unit 88 may in particular comprise an image sensor (for example, an optical camera for image evaluation), a laser unit (for example, a line laser), a LIDAR unit, a RADAR unit, and/or a touch sensor (for sensory touch gauges) for detecting the joint geometry. More expediently, the second sensor unit 88 may also comprise a combination of said units.

Figure 3:
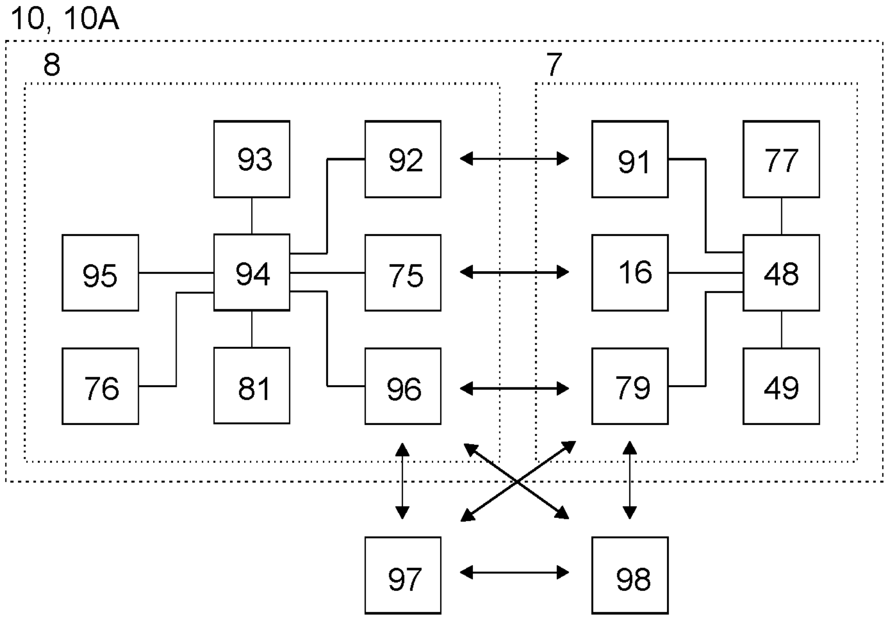

Referring now to FIG. 3, a preferred first composition 10A of the handheld device 10 will be discussed below.

According to the first composition 10A, the handheld device 10 comprises a drive device 7 and an attachment device 8 attached to the drive device 7. The attachment device 8 is removably attached to the drive device 7.

The attachment device 8 comprises the dispensing device 75 and the drive device 7 is used to drive the dispensing device 75. For example, the drive device 7 comprises the electric drive 16, which is coupled to the dispensing device 75 via a mechanical interface. In particular, the electric drive 16 comprises an electric motor with a gear stage.

The drive device 7 further comprises a communication device 79 for communication, in particular for data transmission, with an attachment device communication device 96 of the attachment device 8. Expediently, the attachment device 8 transmits a communication signal to the communication device 79 via the attachment device communication device 96, which communication signal maps the influence quantity and/or comprises a control signal. The communication may be contact-based, for example via plug contacts or sliding contacts, or wireless, for example via Bluetooth or WLAN.

The drive device 7 optionally further comprises an energy interface 91 coupled to an attachment device energy interface 92, preferably wireless or wired. Via the energy interface 91 and the attachment device energy interface 92, an energy transmission between the drive device 7 and the attachment device 8 is expediently performed. The energy transmission is preferably an inductive energy transmission.

The drive device 7 further comprises an operating device 77. Via the operating device 77, the user can expediently start and/or stop the dispensing of filling material 72. Furthermore, the operating device 77 can be used to enter the specification information.

The drive device 7 further comprises an energy storage device 49, for example a rechargeable battery and/or a battery, which is used to supply energy to the handheld device 10, in particular to the electric drive 16.

The drive device 7 further comprises a control unit 48 comprising, for example, at least one microcontroller. The control unit 48 is communicatively connected to the operating device 77, the energy interface 91, the electric drive 16, the communication device 79 and/or the energy storage device 49. The control unit 48 is configured, for example, to control the electric drive 16 based on the communication signal from the attachment device 8 to adjust the dispensing rate r according to the influence quantity.

The attachment device 8 optionally comprises an attachment device energy storage device 93, in particular an accumulator and/or a battery, for (in particular additional) energy supply of the attachment device 8.

The attachment device 8 further comprises an attachment device operating device 95 through which the user can enter, for example, the specification information.

The attachment device 8 further comprises the sensor device 76 for detecting the influence quantity.

The attachment device 8 further comprises a display unit 81 for displaying status information and/or specification information concerning the dispensing of the filling material 72. The status information indicates, for example, how much filling material 72 is present in the filling material container 2 and/or how much filling material 72 has already been dispensed. In particular, the display unit 81 comprises a scale and/or a graphical display. The status information may comprise one or more operating parameters, for example a cartridge fill level, a consumption quantity and/or applied and/or remaining running meters.

The attachment device 8 further comprises an attachment device control unit 94 comprising, for example, at least one microcontroller. The attachment device control unit 94 is communicatively connected to the attachment device energy interface 92, the attachment device energy storage device 93, the attachment device operating device 95, the sensor device 76, the display unit 81, the attachment device communication device 96, and/or the dispensing device 75. In particular, the attachment device control unit 94 is adapted to calculate the communication signal, in particular the control signal, on the basis of the detected influence quantity and to output it to the attachment device communication device 96 for transmission to the drive device 7.

The attachment device 8 may expediently be provided alone, i.e. without the drive device 7. The attachment device 8 is for detachably attaching to the drive device 7 to form the handheld device 10 for dispensing the filling material 72 into the joint 71. The attachment device 8 comprises the dispensing device 75 drivable by the drive device 7 for dispensing the filling material 72 into the joint 71, and the sensor device 76 adapted to detect an influence quantity affecting a body geometry of a filling material body 78 formed by the filling material 72 dispense into the joint 71. The attachment device 8 is adapted to provide, based on the detected influence quantity, the control signal to the drive device 7 to control the drive of the dispensing device 75 to adjust the dispensing rate r at which the dispensing device 75 dispenses the filling material.

Expediently, the communication device 79 and/or the attachment device communication device 96 is designed to communicate with an external device 97 and/or a cloud server 98, for example, to receive the specification information. The communication is preferably wired or wireless, in particular via Bluetooth or WLAN. The external device 97 is, for example, an Internet-of-Things device, a cell phone, a computer, or a tablet.

Figure 4:
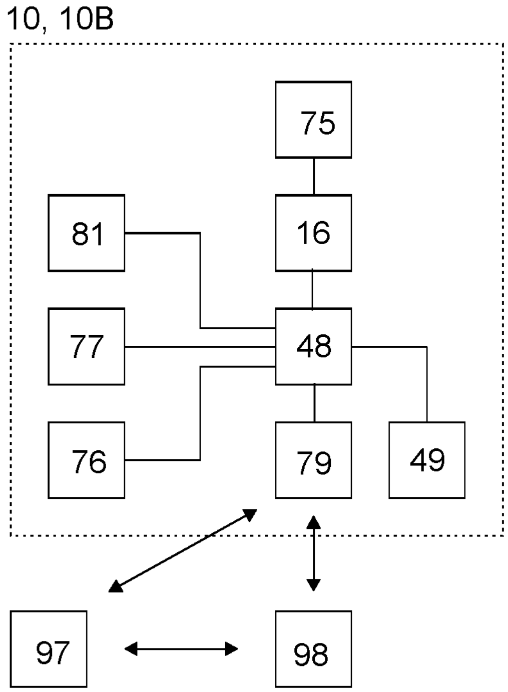

FIG. 4 shows a second possible composition 10B of the handheld device 10. According to the second composition 10B, the handheld device 10 is designed as an integrated device. In particular, according to the second composition 10B, the handheld device 10 does not comprise a removable attachment device. According to the second composition 10B, the handheld device 10 comprises the dispensing device 75, the electric drive 16, the control unit 48, the display unit 81, the operating device 77, the sensor device 76, the communication device 79, and/or the energy storage device 49. Expediently, said units of the composition 10B are formed as explained above (or below). Expediently, said units of the composition 10B are arranged in a common housing. For example, according to the second composition 10B, the electric drive 16, the dispensing device 75 and/or the sensor device 76 are arranged in a common housing. Said units of the composition 10B are expediently interconnected by wire. The control unit 48 is expediently wire-connected to the sensor device 76, and is preferably configured to control the electric drive 16 on the basis of the influence quantity detected with the sensor device 76, in order to adjust the dispensing rate r.

In the following, the specification information will be discussed in more detail. The specification information specifies, for example, the desired body geometry, in particular the desired width, of the filling material body to be achieved by adjusting the dispensing rate r. Furthermore, the specification information may specify a desired amount of filling material per unit length to be achieved by adjusting the dispensing rate r. The specification information can also specify whether only the handheld device speed v, only the joint geometry or both the handheld device speed v and the joint geometry are to be taken into account as influence quantity. The specification information can be expediently entered into the handheld device 10 via the operating device 77 or the attachment device operating device 95. Further, the specification information may be received from the handheld device 10 via the communication device 79 or the attachment device communication device 96, for example, from the external device 97 and/or the cloud server 98. The handheld device 10 is adapted to take the specification information into account when adjusting the dispensing rate r.

According to a preferred embodiment, the handheld device 10 is configured to record the consumption of filling material as filling material consumption information. Preferably, the handheld device 10 is configured to store the filling material consumption information in association with an identifier of a filling material container 2. Expediently, several different filling material containers 2 are used (successively and/or alternately) with the handheld device 10, each filling material container 2 having a different identifier. The handheld device 10 expediently records for each filling material container 2 its own filling material consumption information in association with the respective identifier. Expediently, the handheld device 10 is adapted to store the filling material consumption information in association with location information concerning the location where the consumption takes place. The handheld device 10 is adapted to display the filling material consumption information on the display unit 81 (for example, together with the identifier and/or the location information) and/or is adapted to transmit the filling material consumption information to the external device 97 and/or the cloud server 98 (for example, together with the identifier and/or the location information). Based on the filling material consumption information, for example, a billing of the consumed filling material can be performed.

According to another preferred embodiment, the handheld device 10 is configured to provide a cutting opening information, wherein the cutting opening information represents a recommendation to the user for a cutting of an applicator tip of the handheld device 10 to be performed by the user. The cutting opening information is displayed, for example, via the display unit 81. Expediently, the handheld device 10 is adapted to generate the cutting opening information based on the specification information and/or to adjust the dispensing rate r in consideration of the cutting opening information.

In particular, the handheld device 10 is designed as an intelligent cartridge press which always produces a constant previously defined body geometry independently of the pulling speed (i.e. the handheld device speed v), and optionally independently of the gap geometry (i.e. the joint geometry). Expediently, the relative handheld device speed v of the applicator tip to the substrate, for example the processing area 83, is directly measured or calculated by one or more sensors of the sensor device 76, and from this the dispensing rate r required for a constant line density or constant body geometry is continuously calculated and set.

Before starting work, the user sets the desired standard joint dimension manually, for example via the specification information, and cuts the applicator tip accordingly. If necessary, the applicator tip can be cut to size in a defined manner using an auxiliary tool. In addition, the cutting opening for optimum material output can be output as a recommendation note via the display unit 81. The user positions the applicator tip at the gap geometry (i.e. the joint 71), starts the handheld device 10, in particular the electric drive 16, and pulls the handheld device 10 at any desired pulling speed (i.e. the handheld device speed v) along the joint path 74. In doing so, the handheld device 10 always applies the correct amount of filling material by adjusting the dispensing rate r. To complete the creation of the filling material body, the handheld device 10 is stopped by the user. The user then shapes and smoothes the filling material body.

Further exemplary features of the handheld device 10 will be discussed below:

The handheld device 10 comprises a receptacle 1 (see FIG. 5) for a filling material container 2. The filling material container 2 is exemplarily designed as a cartridge. Alternatively, the filling material container can be designed as a tubular bag.

Figure 6:
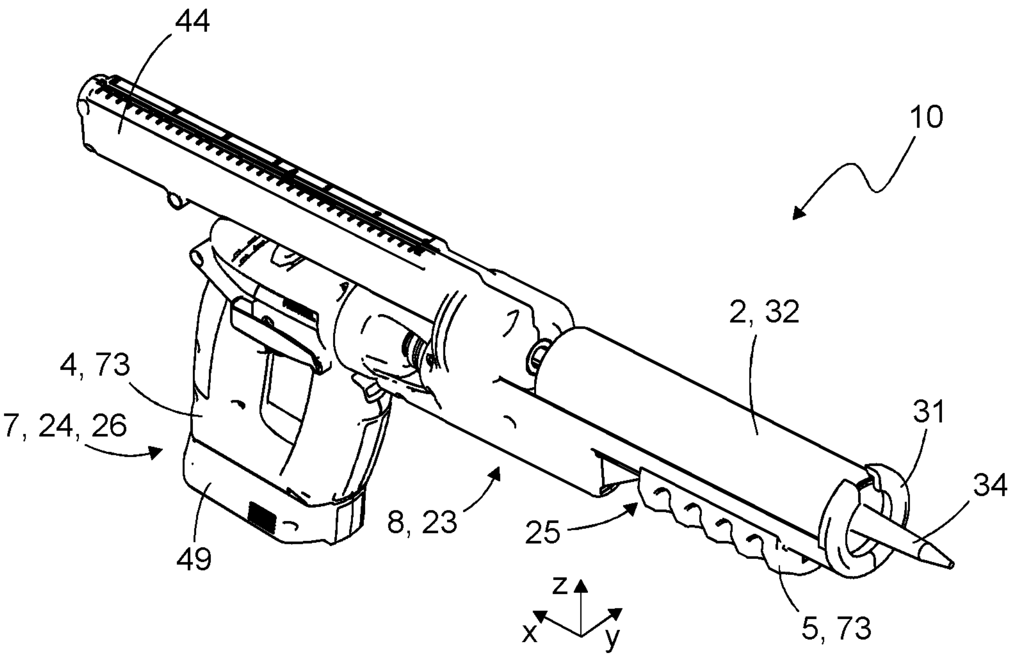

FIGS. 1 and 6 show the handheld device 10 with a filling material container 2 inserted in the receptacle 1. Here, the handheld device 10 includes the filling material container 2. The handheld device 10 can also be provided without the filling material container 2 inserted (cf. FIG. 5).

The basic shape of the handheld device 10 comprises a horizontal section 23 and a vertical section 24. The horizontal section 23 is elongated and oriented with its longitudinal axis parallel to the x-direction. The vertical section 24 is attached to the bottom of the horizontal section 23 and, starting from the horizontal section 23, extends downwardly, in particular vertically downwardly. Exemplarily, the basic shape of the handheld device 10 comprises the horizontal section 23 and the vertical section 24. Exemplarily, the handheld device 10 has a T-shaped basic shape.

The horizontal section 23 includes the receptacle 1, the dispensing device 75, and/or optionally a stabilizing handle 5 of the handle assembly 73. The vertical section 24 includes a carrying handle 4 of the handle assembly 73.

In an exemplary embodiment, the handheld device 10 comprises a shaft section 25. In an exemplary embodiment, the shaft section 25 is elongated and oriented with its longitudinal axis parallel to the x-direction. The shaft section 25 is part of the horizontal section 23; expediently, the shaft section 25 is the front longitudinal section of the horizontal section 23. The shaft section 25 comprises the receptacle 1, which is arranged in particular on the upper side of the shaft section 25. On the shaft section 25, in particular on the underside of the shaft section 25, the stabilizing handle 5 is expediently arranged.

In an exemplary embodiment, the handheld device 10 includes a drive section 26. In an exemplary embodiment, the drive section 26 is provided by the vertical section 24. In particular, the drive section 26 is configured to provide the drive of the dispensing device 75. The drive section 26 comprises the electric drive 16, in particular an electric motor, for driving the dispensing device 75.

Exemplarily, the handheld device 10 comprises a drive device 7 for a screwing and/or drilling power tool. The drive device 7 is expediently the drive section 26. The drive device 7 can be used in particular as a screwdriving and/or drilling power tool, for example as a cordless screwdriver. The drive device 7 is expediently detachable from the handheld device 10, and (in particular after attachment of a tool, for example a drill or a screwdriver blade) usable for screwing and/or drilling. The drive device 7 is comprises the carrying handle 4.

The handheld device 10 comprises the attachment device 8. The attachment device 8 expediently comprises the shaft section 25. Exemplarily, the attachment device 8 is the horizontal section 23. The attachment device 8 is attached, in particular detachably attached, to the drive section 26, in particular the drive device 7. The attachment device 8 comprises the stabilizing handle 5. The attachment device 8 is expediently configured as a cartridge press attachment device. The attachment device 8 can also be designed as a tubular bag press attachment device.

The drive section 26, in particular the drive device 7, comprises a drive interface 27 for providing a drive rotary motion, which is generated in particular by means of the electric drive 16. The attachment device 8 comprises a receiving interface 28 for receiving the input rotary motion provided at the drive interface 27. The attachment device 8 is connected with the receiving interface 28 to the drive interface 27 of the drive section 26.

Preferably, the attachment device 8 is rotatable relative to the drive device 7 about an axis of rotation aligned parallel to the longitudinal direction of the handheld device 10. Exemplarily, the handheld device 10 comprises a pivot bearing by means of which the attachment device 8 is mounted on the drive device 7 so as to be rotatable about the axis of rotation 9. Expediently, the attachment device 8 can be rotated by means of the pivot bearing in an angular range of at least 100 degrees, in particular at least 140 degrees, relative to the drive device 7.

The receptacle 1 is designed to receive the filling material container 2. The receiving base 29 of the receptacle 1 is shaped in particular to correspond to the shape of the filling material container 2. Exemplarily, the filling material container 2 has a cylindrical, in particular circular-cylindrical, shape. The receiving base 29 defines a cylindrical segment-shaped receptacle recess which corresponds to the cylindrical shape of the filling material container 2 and into which the cylindrical filling material container 2 can be inserted. In particular, the receptacle 1 is groove-shaped. Exemplarily, the receptacle 1 is designed as a half-shell, in particular as a half-shell open towards the top. The receptacle 1 can also be referred to as an open receptacle 1.

Figure 7:
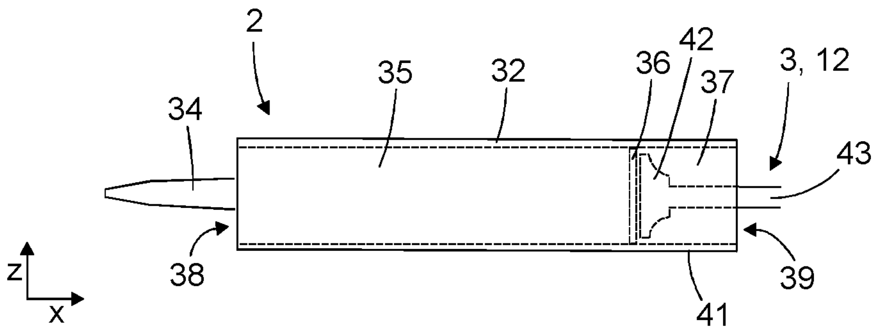

FIG. 7 shows an exemplary embodiment of the filling material container 2. The filling material container 2 comprises the container body 32, which is shaped in particular cylindrically, preferably circular-cylindrically. Exemplarily, the container body 32 is hollow cylindrical in shape. The longitudinal axis of the container body 32 is aligned parallel to the x-direction. The container body 32 has a front end face 38 and a rear end face 39, each of which is suitably oriented perpendicular to the x-direction. The rear end face 39 is suitably configured to be open in the x-direction, so that a receiving space 37 (for receiving a pressing element 12) is accessible via the rear end face 39. The receiving space 37 is bounded in the radial direction by a rear hollow cylindrical body section 41 of the container body 32. Furthermore, the receiving space 37 is bounded in the negative x-direction by a particularly disc-shaped pressing section 36. In the positive x-direction, the receiving space 37 is open. The receiving space 37 is in particular cylindrical.

The filling material container 2 is preferably designed as a cartridge, in particular as a joint sealant cartridge, for example as a silicone cartridge or acrylic cartridge. The filling material container 2 comprises a filling material chamber 35 arranged in the container body 32, in which the filling material 72 to be dispensed is located. The filling material 72 is in particular joint sealant, for example silicone or acrylic.

The filling material container 2 comprises a dispensing element 34, which is designed in particular as an applicator tip and is expediently aligned with its longitudinal axis parallel to the x-direction. The dispensing element 34 is arranged at the front end face 38. The filling material container 2 further comprises the pressing section 36 which, when pressed, reduces the filling material chamber 35 so that the filling material 72 is dispensed from the filling material container 2 by the dispensing element 34. The pressing section 36 is disposed at the rear end face 39 and/or is accessible through the rear end face 39.

In particular, the pressing section 36 is movable in the (negative) x-direction to effect the dispensing of the filling material. The negative x-direction shall also be referred to as the forward direction, and the positive x-direction shall be referred to as the reverse direction. Exemplarily, the pressing section 36 is disc-shaped. The pressing section 36 is inserted into the hollow cylindrical container body 32 and is movable in the x-direction relative to the hollow cylindrical container body 32 to reduce the filling material chamber 35. The pressing section 36 may also be referred to as a piston member or a base, in particular a cartridge base. On the side of the pressing section 36 facing away from the filling material chamber 35, there is the receiving space 37 for receiving the pressing element 12 of the pressing device 3.

The dispensing device 75 expediently comprises the filling material container 2. The dispensing device 75 further comprises the pressing device 3 for pressing the filling material container 2 to cause dispensing of filling material 72 contained in the filling material container 2. Expediently, the pressing device 3 further serves to lock the filling material container 2 in the receptacle 1 so that the filling material container 2 cannot be removed from the receptacle 1.

The pressing device 3 comprises a pressing element 12, by means of which the pressing section 36 can be pressed (in negative x-direction) in order to cause the filling material 72 to be dispensed from the filling material chamber 35. The pressing element 12 further serves to support the filling material container 2 (inserted into the receptacle 1 and applied against a front stop structure 31) in (positive) x-direction and/or radial direction (in particular z-direction and/or y-direction) and to thus lock the filling material container 2 in the receptacle 1; i.e., in particular to fix it in the receptacle 1 in such a way that the filling material container 2 cannot be removed from the receptacle 1.

The pressing element 12 comprises, by way of example, a pressing head 42 which can be inserted into the receiving space 37 and/or can be placed directly against the pressing section 36. The pressing head 42 is exemplarily designed as a press plunger and has in particular a disk-shaped end section. In the (positive) x-direction, a rod section 43 adjoins the pressing head 42. The rod section 43 is designed in particular as a spindle 18 and expediently has a thread, in particular an external thread. The rod section 43 is aligned with its longitudinal axis parallel to the x-direction.

The horizontal section 23 of the handheld device 10 may also be referred to as the pressing section. The horizontal section 23 comprises the shaft section 25 already explained above. The horizontal section 23 further comprises a rear longitudinal section 44 adjoining the shaft section in (positive) x-direction. Exemplarily, the rear longitudinal section 44 extends in (positive) x-direction behind the drive section 26, in particular behind the carrying handle 4. The rear longitudinal section 44 serves in particular to receive the rod section 43 of the pressing element 12.

The pressing device 3 further comprises a drive mechanism for driving the pressing element 12. The drive mechanism serves to drive the pressing element 12 in the forward direction, so as to cause the filling material 72 to be dispensed from the filling material container 2. In particular, the drive mechanism is configured to convert the rotational drive motion provided by the drive section 26, in particular the electric drive 16, into a linear motion of the pressing element 12. The linear movement is in particular a forward movement, expediently in the (negative) x-direction.

The drive mechanism includes a drive element 17 which is coupled to the pressing element 12 and which is used to drive the pressing element 12. The drive element 17 is capable of being set in an output rotational motion based on the input rotational motion (provided by the drive section 26), and is adapted to set the pressing element 12 in the linear motion based on the output rotational motion. Exemplarily, the drive element 17 has teeth on its outer periphery. Furthermore, the drive element 17 has a central aperture on which an internal thread is provided. The drive element 17 may also be referred to as a spindle nut, a gear, or a spindle nut gear. The spindle 18 of the pressing element 12 extends through the central aperture. The spindle 18 has its external thread in engagement with the internal thread of the drive element 17, so that the spindle 18 is set in linear motion when the drive element 17 rotates.

The drive mechanism further comprises a coupling gear 45 through which the drive element 17 is coupled to the drive section 26. The coupling gear 45 engages the teeth of the drive element 17. Exemplarily, the coupling gear 45 has a smaller diameter than the drive element 17. Exemplarily, the coupling gear 45 is arranged below the drive element 17 in the z-direction. The coupling gear 45 is non-rotatably coupled to an output shaft 46 of the receiving interface 28. Exemplarily, the coupling gear 45 is arranged coaxially with the output shaft 46. The output shaft 46 is oriented parallel to the x-direction. The output shaft 46 is coupled to the drive section 26, in particular via the receiving interface 28 to the drive interface 27, and is set into the output rotational movement by the input rotational movement provided by the drive section 26. The output rotary motion is transmitted to the drive element 17 via the coupling gear 45.

The handheld device 10 comprises an operating device 77. The operating device 77 comprises an operating element 47, by means of which the drive of the pressing element 12 can be controlled—and thereby the dispensing of the filling material 72 from the filling material container 2. In particular, the operating element 47 can be used to start and/or stop the dispensing of the filling material 72. In particular, the operating element 47 is designed as a button, expediently as a trigger button or pistol trigger. The operating element 47 is arranged on the carrying handle 4, in particular at the upper end of the carrying handle 4. The operating element 47 is operable by the first hand of the user, in a state in which the user grips the carrying handle 4 with the first hand. The operating element 47 is communicatively coupled to a control unit 48, via which the electric drive 16 is controlled.

The handheld device 10 includes the carrying handle 4. The carrying handle 4 allows the handheld device 10 to be carried and guided by a first hand of a user to position the handheld device 10 at a desired position when dispensing the filling material 72.

The carrying handle 4 is exemplarily part of the vertical section 24, in particular of the drive section 26. The carrying handle 4 is exemplarily designed as a pistol grip. The longitudinal axis of the carrying handle 4 is oriented vertically, in particular in the z-direction or in the x-z-direction. The carrying handle 4 is grippable about its longitudinal axis. The carrying handle 4 is arranged in the rear region of the handheld device 10. The carrying handle 4 is preferably at least 8 cm long (in the direction of its longitudinal axis).

The handheld device 10 further comprises a stabilizing handle 5. The stabilizing handle 5 allows the handheld device 10 to be gripped by a second hand of the user and stabilized during dispensing of the filling material 72, in particular while the user is gripping the carrying handle 4 with his first hand. The stabilizing handle 5 is exemplarily arranged further forward (i.e. further in negative x-direction) than the carrying handle 4.

The invention claimed is:

1. A handheld device for dispensing filling material into a joint, comprising:

a handle assembly for manually gripping the handheld device and moving the handheld device along a joint path, a dispensing device for dispensing the filling material into the joint, and a sensor device adapted to detect an influence quantity influencing a body geometry of a filling material body formed by the filling material dispensed into the joint, wherein the handheld device is configured to adjust, based on the detected influence quantity, a dispensing rate at which the dispensing device dispenses the filling material, the handheld device further comprising an operating device for inputting specification information and/or a communication device for receiving the specification information, wherein the handheld device is configured to take the specification information into account when adjusting the dispensing rate.

2. The handheld device of claim 1, wherein the influence quantity comprises a handheld device speed at which the handheld device is moved.

3. The handheld device according to claim 2, wherein the handheld device comprises a dispensing element for dispensing the filling material into the joint, and the handheld device speed is the speed of the dispensing element relative to the joint path.

4. The handheld device according to claim 1, wherein the influencing quantity concerns a joint geometry.

5. The handheld device according to claim 1, wherein the handheld device is configured to adapt the dispensing rate on the basis of the detected influence quantity in such a way that the filling material body formed by the filling material dispensed into the joint has a predetermined body geometry.

6. The handheld device according to claim 1, wherein the handheld device is configured to adapt the dispensing rate on the basis of the influencing quantity in such a way that the dispensing device outputs a predetermined quantity of filling material per unit length of the joint path along the joint path.

7. The handheld device according to claim 1, wherein the handheld device is adapted to increase the dispensing rate of the filling material in response to an increasing detected handheld device speed and/or to reduce the dispensing rate of the filling material in response to a decreasing detected handheld device speed.

8. The handheld device according to claim 1, wherein the sensor device for detecting the influence quantity comprises an acceleration sensor, an odometry unit, a laser unit, an image sensor, a LIDAR unit, a RADAR unit, and/or a touch sensor.

9. The handheld device according to claim 1, comprising a drive device and a detachable attachment device attached to the drive device, wherein the attachment device comprises the dispensing device and the drive device is for driving the dispensing device.

10. The handheld device according to claim 1, wherein the handheld device is a cartridge press and/or a tubular bag press.

11. The handheld device according to claim 3, wherein the dispensing element is an applicator tip.

12. The handheld device according to claim 5, wherein the handheld device is configured to adapt the dispensing rate on the basis of the detected influence quantity in such a way that the filling material body formed by the filling material dispensed into the joint has a predetermined width.

13. The handheld device according to claim 5, wherein the handheld device is configured to adapt the dispensing rate on the basis of the detected influence quantity in such a way that the filling material body formed by the filling material dispensed into the joint has a constant width.

14. A handheld device for dispensing filling material into a joint, comprising:

a handle assembly for manually gripping the handheld device and moving the handheld device along a joint path, a dispensing device for dispensing the filling material into the joint, and a sensor device adapted to detect an influence quantity influencing a body geometry of a filling material body formed by the filling material dispensed into the joint, wherein the handheld device is configured to adjust, based on the detected influence quantity, a dispensing rate at which the dispensing device dispenses the filling material, the handheld device further comprising a display unit for displaying status information and/or specification information concerning the dispensing of the filling material.

15. A handheld device for dispensing filling material into a joint, comprising:

a handle assembly for manually gripping the handheld device and moving the handheld device along a joint path, a dispensing device for dispensing the filling material into the joint, and a sensor device adapted to detect an influence quantity influencing a body geometry of a filling material body formed by the filling material dispensed into the joint, wherein the handheld device is configured to adjust, based on the detected influence quantity, a dispensing rate at which the dispensing device dispenses the filling material, and wherein the handheld device is adapted to record a consumption of filling material as filling material consumption information.

16. The handheld device according to claim 15, wherein the handheld device is adapted to store the filling material consumption information in association with an identifier of a filling material container.

17. The handheld device according to claim 15, wherein the handheld device is adapted to store the filling material consumption information in association with location information concerning the location where the consumption occurs.

18. The handheld device according to claim 1, wherein the handheld device is adapted to provide cutting opening information, the cutting opening information representing a recommendation to the user for a cutting of an applicator tip of the handheld device to be performed by the user.

* * * * *